July 14, 1942.  G. E. DATH  2,289,348
FRICTION SHOCK ABSORBING MECHANISM
Filed Aug. 22, 1941
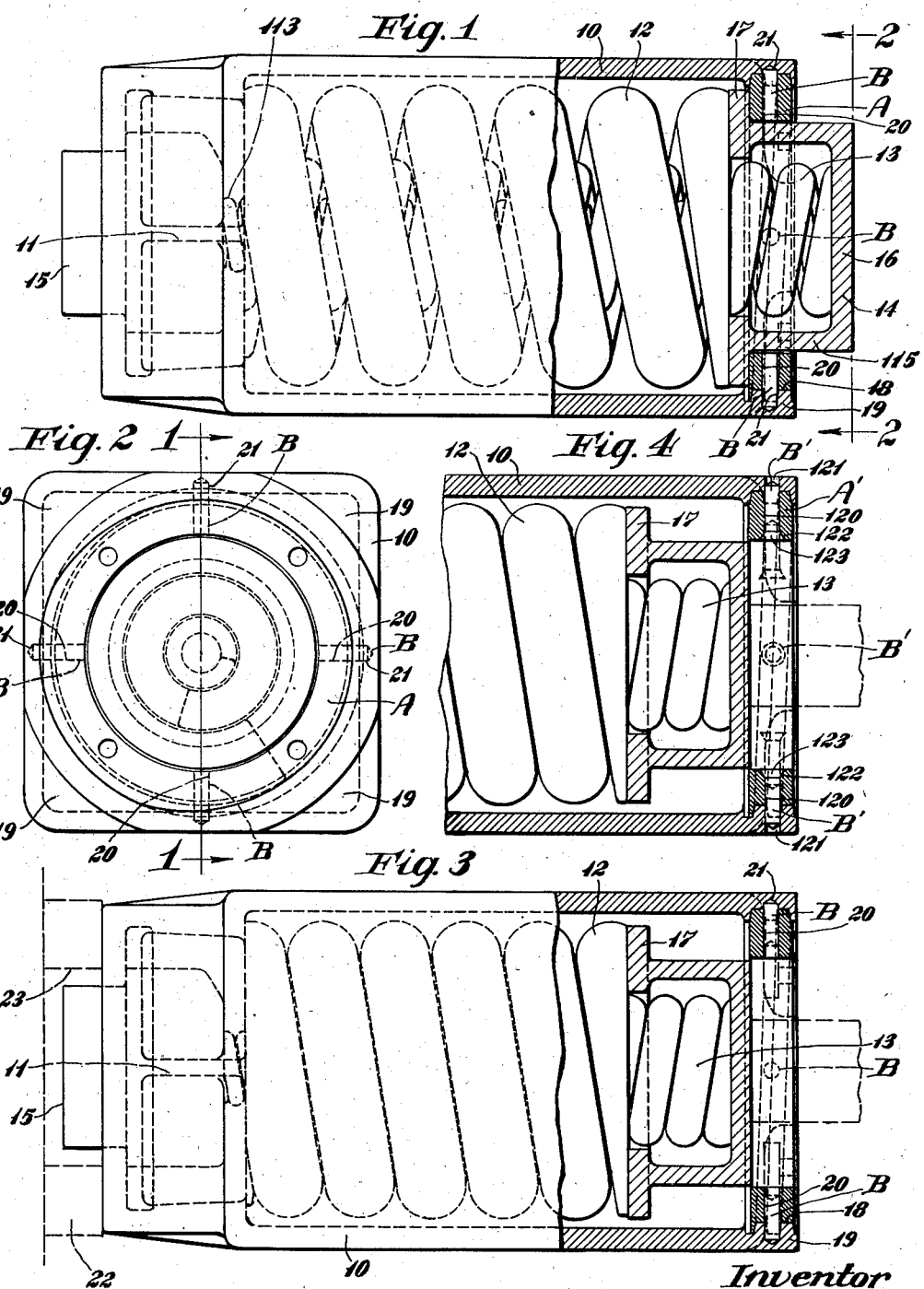
Inventor
George E. Dath
By Henry Fuchs
Atty.

Patented July 14, 1942

2,289,348

UNITED STATES PATENT OFFICE 2,289,348

FRICTION SHOCK ABSORBING MECHANISM

George E. Dath, Mokena, Ill., assignor to W. H. Miner, Inc., Chicago, Ill., a corporation of Delaware Application August 22, 1941, Serial No. 407,851

6 Claims. (Cl. 213—24)

This invention relates to improvements in friction shock absorbing mechanisms, and more particularly to mechanisms of this character comprising a casing having a friction shell section at one end thereof, a friction clutch comprising a wedge and shoes slidable within the shell, a spring resistance opposing inward movement of the shoes, and a movable spring cap at the other end of the mechanism, movement of which inwardly of the casing is opposed by said spring resistance, wherein means is provided in the form of a screw ring for detachably connecting the spring cap to the casing.

One object of the invention is to provide in a shock absorbing mechanism of the character hereinbefore described, means which may be readily applied and removed for locking the screw ring for the spring cap against rotation and thereby prevent accidental loosening or detachment of the ring.

A more specific object of the invention is to provide a friction shock absorbing mechanism, including a casing and a spring resisted part, such as a spring cap for providing preliminary spring resistance, movable lengthwise of the casing, and a detachable retaining ring screw threaded into the casing and having shouldered engagement with the movable part to anchor the same to the casing, wherein simple and efficient locking means in the form of a bolt or pin is provided for locking the ring against rotation with respect to the casing to prevent accidental unscrewing of the same, and the locking bolt or pin is blocked against removal by the spring cap when in its normal position.

Other objects of the invention will more clearly appear from the description and claims hereinafter following.

In the drawing forming a part of this specification Figure 1 is a part plan and part horizontal longitudinal sectional view of a friction shock absorbing mechanism illustrating my improvements in connection therewith. Figure 2 is a rear elevational view of the mechanism shown in Figure 1, looking in the direction of the arrows 2—2 of said figure. Figure 3 is a view similar to Figure 1 showing the spring cap forced inwardly and illustrating the manner in which the retaining pin or bolt is applied. Figure 4 is a view similar to Figure 3, illustrating another embodiment of the invention, a portion of the mechanism being broken away.

In said drawing, my improvements are illustrated in connection with a friction shock absorbing mechanism similar to the mechanism illustrated in Patent No. 2,050,541 granted to R. J. Olander, August 11, 1936, with the exception that the rear portion of the casing is of square cross-section, instead of being cylindrical as shown in said patent. The friction shock absorbing mechanism illustrated comprises a friction casing 10 of substantially rectangular transverse cross-section at the rear end portion thereof, a friction clutch 11 slidable within the forward end portion of the casing which is shown as of hexagonal contour, springs 12, 13 and 113 within the casing opposing movement of the clutch inwardly of the casing, and a spring cap 14 at the rear end of the casing adapted to provide preliminary light spring capacity.

The wedge block 15 of the friction clutch is held assembled with the casing by shouldered engagement with an inturned stop flange at the open front end of the casing in the same manner that the wedge block is held assembled in the structure shown in said Olander patent.

Referring first to the embodiment of the invention illustrated in Figures 1, 2 and 3 my improvements comprise broadly a retaining ring A having interior threaded connection with the casing 10 and shouldered engagement with the spring cap 14, and a securing element B for holding the ring against unscrewing.

The spring cap 14 is of cup shaped form comprising a short hollow cylindrical tube like section 115 closed at its outer end by a transverse wall 16 and having an annular outstanding flange 17 at its inner end adapted to engage the ring A to limit outward movement of the cap.

The retaining ring A is externally screw threaded and is screwed into an internally threaded opening 18 provided in the rear end wall 19 of the casing 10. The opening of the ring A is of such a size as to freely accommodate the tubular portion of the cap 14 for in and out movement. The ring is provided with one or more radial bores or openings 20 extending therethrough, and the rear portion of the casing 10 is provided with a corresponding number of aligned bores or recesses 21 which extend only part way therethrough. In other words, the bores 21 are closed at their outer ends. In the structure illustrated in the drawing the ring and casing are shown as provided with four such openings or bores 20—20—20—20 and 21—21—21—21. However it will be understood that a greater or lesser number of such bores may be employed, and a single bore 20 in the ring and a single aligned bore is sufficient in some instances.

The securing element B is in the form of a short pin, as shown in Figures 1, 2 and 3, one such pin being engaged through each opening 20 of the ring A and extending into the aligned bore 21 of the casing 10. The pins B are of such a length that the ends thereof nearest the cap 14 are flush with the wall of the opening of the ring A. As will be seen upon reference to Figure 1, when the cap 14 is in normal position it completely blocks the removal of the pins B, and is maintained in the projected position by the springs 12 and 13.

In assembling the mechanism the friction clutch 11 and the springs 12 and 13 are first placed within the casing 10 by entering the same through the opening 18 at the rear end of the casing. The cap 14 is then inserted into the opening 18 and the front end of the casing placed against a supporting block 22 shown in dotted lines in Figure 3. The block 22 has an opening 23 to accommodate the projecting portion of the wedge 15 so that the casing directly abuts the block. The ring A is then placed over the projecting portion of the cap 14 and the cap forced inwardly by a pressure transmitting bar shown in dotted lines in Figure 3.

The cap is forced inwardly until it completely clears the bores 20 of the ring A as illustrated in Figure 3 and is held in that position while the ring A is screwed into the opening 18 and the bores 20 thereof aligned with the bores 21 of the casing. While the cap is still being held in the position shown in Figure 3, the pins B are inserted in the aligned bores of the ring and casing, thus locking the ring against unscrewing. The pressure on the cap 14 is then removed, permitting the springs to project the same to the position shown in Figure 1, thereby blocking removal of the pins. In this connection it is pointed out that in the normal operation of the mechanism, when in service on a railway car, inward movement of the cap 14 is limited to a position wherein the outer end of the same is flush with the rear end of the casing 10. Thus removal of the pins B is effectively blocked in all possible positions of the cap in actual service.

Removal of the pins B either to adjust the ring or completely detach the same to take apart the mechanism may be easily accomplished when the cap is forced inwardly as shown in Figure 3.

Referring next to the embodiment of the invention illustrated in Figure 4, the construction differs from that shown in Figures 1, 2 and 3 only in that the bores of the casing which are indicated by 121 and correspond to the bores 21 hereinbefore described, extend entirely through the casing wall, that the bores of the ring which are indicated by 120 are countersunk as indicated at 122 and that the pins which are engaged through said bores of the ring and casing are headed at their inner ends as indicated at 123.

The ring A' in Figure 4, which corresponds to the ring A hereinbefore described, has the countersunk portions 122 of the bores 120 thereof tapered, and the heads 123 of the pins B' which correspond to the pins B are similarly tapered or conical to properly seat in said bores with the outer ends of the heads flush with the wall of the ring opening.

By providing bores extending entirely through the walls of the casing the drilling of these openings or bores is greatly facilitated as the work can be done from outside the casing.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a casing having an open end provided with internal threads; of a spring cap slidable within the casing; a retaining ring having external threads in threaded engagement with said internal threads of the casing, said spring cap having shouldered engagement with said ring to limit outward movement of the cap; means for locking the ring to the casing, comprising a pin extending through said ring from the interior thereof into the wall of the casing; and spring means within the casing yieldingly holding said cap projecting through said ring to block removal of said pin.

2. In a shock absorbing mechanism, the combination with a casing having a circular opening at one end, said opening being threaded; of a spring cap slidable within the casing; a retaining ring in threaded engagement with the threads of said opening, said spring cap having an external flange at its inner end in shouldered engagement with the ring, said ring and casing having aligned bores in the walls thereof, said bore of the casing wall being closed at the outer end; a pin seated in the bore of said ring and extending into the bore of the casing wall to lock said ring against rotation with respect to the casing; and springs within the casing holding said cap projected and in blocking relation with respect to the inner ends of the pin.

3. In a shock absorbing mechanism, the combination with a casing having a circular opening at one end; of a locking ring screwed into said opening, said ring being provided with radial bores extending therethrough; a spring cap slidable in said casing and extending through said ring; pins for locking said ring within said opening of the casing, said pins being seated in the bores of the ring and extending into the wall of the casing; means on said cap having shouldered engagement with the ring to limit outward movement of the cap; and spring means within the casing for yieldingly holding said cap projected and overlying the inner ends of said pins to block removal of the latter.

4. In a shock absorbing mechanism, the combination with a casing having an open end; of a spring cap movable lengthwise with respect to the casing; a spring yieldingly holding said cap projected; a ring screwed into said casing; and means for locking said ring against rotation with respect to the casing, comprising pins extending through said ring and into the casing wall, said pins being headed at their inner ends to prevent outward displacement thereof, said cap overlying said heads to hold the pins against inward displacement.

5. In a shock absorbing mechanism, the combination with a casing having an opening at one end; of a retaining ring screwed into said opening; a spring cap slidable lengthwise of the mechanism and extending through said ring, said cap having a flange at the inner end in shouldered engagement with the ring to restrict outward movement of the cap; headed pins extending through said ring and into the wall of the casing to lock the ring to said casing, said pins having the heads thereof seated on the interior of the ring; and spring means in the casing yieldingly holding said cap projecting over the heads of said pins to block removal thereof.

6. In a shock absorbing mechanism, the combination with a casing having the rear end portion thereof partly closed by a vertical end wall, said rear wall being provided with a circular opening which is internally threaded; of a threaded ring screwed into said opening, said ring and said casing wall having radially disposed aligned bores extending therethrough, the bores of said ring being countersunk at their inner ends; headed pins for locking the ring against rotation, said pins extending through said bores of the ring and into the bores of the casing wall with their heads seated in said countersunk portions of the bores of the ring and with the outer ends of their heads flush with the inside of the ring; a spring cap having shouldered engagement with the ring to limit outward movement of the cap, said cap having a portion thereof projecting through said ring and filling the opening of the same to block removal of said pins; and spring means within the casing yieldingly holding said cap projected through said ring.

GEORGE E. DATH.